US008396492B2

(12) United States Patent
Hu

(10) Patent No.: US 8,396,492 B2
(45) Date of Patent: Mar. 12, 2013

(54) METHOD FOR A USER EQUIPMENT PERFORMING FREQUENCY-LAYER OPERATIONS IN MULTIMEDIA BROADCAST/MULTICAST SERVICES

(75) Inventor: Hao Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1242 days.

(21) Appl. No.: 11/574,053

(22) PCT Filed: Mar. 31, 2006

(86) PCT No.: PCT/CN2006/000575
§ 371 (c)(1),
(2), (4) Date: May 3, 2007

(87) PCT Pub. No.: WO2006/102853
PCT Pub. Date: Oct. 5, 2006

(65) Prior Publication Data
US 2009/0116417 A1 May 7, 2009

(30) Foreign Application Priority Data
Mar. 31, 2005 (CN) .......................... 2005 1 0059675

(51) Int. Cl.
H04W 72/00 (2009.01)
(52) U.S. Cl. .......... 455/464; 455/62; 455/338; 455/436; 370/312; 370/329
(58) Field of Classification Search .................. 455/328, 455/436–444, 62, 464; 370/312, 329
See application file for complete search history.

(56) References Cited

U.S. PATENT DOCUMENTS 7,124,428 B2 * 10/2006 Hirayama ...................... 725/114
7,546,132 B2 * 6/2009 Lee et al. ....................... 455/503
(Continued)

FOREIGN PATENT DOCUMENTS
CN 1551677 A 12/2004
EP 1 467 586 A2 10/2004
(Continued)

OTHER PUBLICATIONS

ETSI Standards, "Universal Mobile Telecommunications System (UMTS); Introduction of Multimedia Broadcast/Multicast Service (MBMS) in the Radio Access Network (RAN)," 3-R2(V630) (Dec. 2004).

(Continued)

Primary Examiner — Amancio Gonzalez
(74) Attorney, Agent, or Firm — Leydig, Voit & Mayer, Ltd.

(57) ABSTRACT

A method for a User Equipment (UE) performing frequency-layer operations in Multimedia Broadcast and Multicast Services (MBMSs) is disclosed, with priorities preset for various frequency-layer operations, the procedure of performing frequency-layer operations includes the steps of: receiving control information of the MBMSs sent from the network; and performing the frequency-layer operations of the activated MBMSs included in the control information of the MBMSs according to the priorities of frequency-layer operations. By using the method in accordance with embodiments of the present invention, it is possible to avoid wrong frequency-layer operations under the circumstances of a UE joining multiple MBMSs, thus achieving the highest procedural efficiency with the least consumption and improving the efficiency of the UE.

27 Claims, 6 Drawing Sheets

U.S. PATENT DOCUMENTS

| | | |
|---|---|---|
| 2004/0202140 A1 | 10/2004 | Kim et al. |
| 2005/0090278 A1 | 4/2005 | Jeong et al. |
| 2006/0023664 A1 | 2/2006 | Jeong et al. |
| 2006/0039309 A1* | 2/2006 | Lee et al. ............ 370/312 |
| 2006/0056347 A1 | 3/2006 | Kwak et al. |
| 2006/0252439 A1 | 11/2006 | Cai |

FOREIGN PATENT DOCUMENTS

| | | |
|---|---|---|
| EP | 1 509 056 A2 | 2/2005 |
| EP | 1 622 316 A1 | 2/2006 |
| EP | 1 635 597 A2 | 3/2006 |
| WO | WO 2004/100590 A1 | 11/2004 |

OTHER PUBLICATIONS

PCT Written Opinion of the International Searching Authority (Jun. 15, 2006).

Extended European Search Report in corresponding European Application No. 10015480.6 (Mar. 7, 2011).

"3GPP TSG RAN WG2 #44—MBMS services and multiple layers in FLC," Oct. 4-8, 2004, 3$^{rd}$ Generation Partnership Project, Sophia Antipolis, France.

"3GPP TS 25.331," Mar. 2005, V6.5.0, 3GPP, Valbonne, France.

* cited by examiner

METHOD FOR A USER EQUIPMENT PERFORMING FREQUENCY-LAYER OPERATIONS IN MULTIMEDIA BROADCAST/MULTICAST SERVICES

This application is the U.S. national phase of International Patent Application PCT/CN2006/000575, filed on Mar. 31, 2006, which claims priority to Chinese Patent Application No. 200510059675.4, filed Mar. 31, 2005, all of which are hereby incorporated by reference.

FIELD OF THE INVENTION

The present invention relates to techniques for implementing Multimedia Broadcast/Multicast Services (MBMSs), and in particular, to a method for a User Equipment (UE) performing frequency-layer operations in MBMSs.

BACKGROUND OF THE INVENTION

Multicast and broadcast are techniques for transferring data from one data source to multiple destinations. In a traditional mobile network, the Cell Broadcast Service (CBS) allows low bit-rate data to be transferred to all users via a shared broadcasting channel of a cell, which is categorized as a message service. At present, voice and message services can not satisfy people's need for mobile communications. Along with the rapid development of the Internet, there is emerging a great deal of multimedia services, some applications of which require that multiple users are able to receive the same data at the same time, e.g. video on demand, video cast, video conference, network-based education, and interactive video games. Compared with conventional data, these multimedia services are featured with large data flow, long time duration, and high sensitivity to time delay. The existing IP multicast techniques make it possible to implement these multimedia services in the form of multicast or broadcast on cabled IP networks. However, as mobile networks have special network architectures, functional entities, and radio interfaces, which are all different from those of cabled IP network, existing IP multicast techniques are not applicable to mobile networks.

In order to make efficient use of resources of mobile networks, the WCDMA/GSM global standardization organization, 3GPP, has put forward the Multimedia Broadcast/Multicast Service (MBMS), designed to provide point to point services of transferring data from one data source to multiple users in mobile networks so as to share network resources and improve the utility rate of network resources, especially the utility rate of resources of radio interfaces. The MBMS defined by 3GPP can multicast and broadcast not only low-rate text messages but also high-rate multimedia services, which is no doubt in accordance with the trend of future development of mobile data.

A reference model of the architecture of an MBMS system is shown in FIG. 1. In order to support the MBMS, a new mobile functional network entity—Broadcast Multicast-Service Center (BM-SC) is added to a mobile network, which is the entrance of content providers and is used in authorizing and initiating an MBMS bearer service as well as transferring MBMS contents according to a pre-defined schedule.

In addition, functional entities such as UEs, the UMTS Terrestrial Radio Access Network (UTRAN), the GSM Edge Radio Access Network (GERAN), the Serving GPRS Support Node (SGSN), and the GPRS Gateway Support Node (GGSN), are enhanced to incorporate functions relevant with the MBMS.

The MBMS includes a multicast mode and a broadcast mode. In the multicast mode, it is necessary for a user to subscribe to a corresponding multicast group, implement service activation, and generate corresponding accounting information. As there is a difference between the multicast mode and the broadcast mode in service demands, the service procedures of them are different.

There are two modes for transferring the MBMS between the UTRAN and UEs: a Point to Multipoint (PTM) mode and a Point to Point (PTP) mode. In the PTM mode, same data are sent via an MBMS PTM Traffic Channel (MTCH), and may be received by all UEs which have joined the multicast service group or are interested in the broadcast service. In the PTP mode, data are sent via a Dedicated Traffic Channel (DTCH), and can be received by only one corresponding UE.

The complete procedure for a UE receiving a particular MBMS broadcast service is shown in FIG. 2, while the complete procedure for a UE receiving a particular MBMS multicast service is shown in FIG. 3. As seen from FIG. 3, the specific steps for a UE receiving a particular MBMS multicast service includes:

1. Subscription: Setting up a connection between a UE and a service provider;
2. Service announcement: Notifying the UE of information related with the MBMS;
3. Joining: the UE informing the network that it is ready to receive the MBMS;
4. Session Start: the BM-SC getting prepared for data transfer;
5. MBMS notification: the RNC (Radio Network Controller) notifying the UE of the transfer of MBMS multicast data;
6. Data transfer;
7. Session Stop: the BM-SC will no longer transfer data, and therefore bearer resources can be released;
8. Leaving: the UE is no longer a member of the MBMS multicast group.

First, the features and relevant information of the MBMS PTM Control Channel (MCCH) are described below.

The MCCH information is transferred based on a fixed scheduling method. The UTRAN repeatedly transfers the MCCH information to improve the stability. The MCCH scheduling is consistent for all services.

The entire MCCH information is periodically transferred based on a "Repetition period". "Modification period" is defined as an integral multiple of "Repetition period". MBMS Access Information is periodically transferred based on an "access information period". Meanwhile, "Repetition period" is also an integral multiple of "access information period".

The MCCH information is categorized into critical information and non-critical information. The critical information includes MBMS NEIGHBORING CELL INFORMATION, MBMS SERVICE INFORMATION, and MBMS RADIO BEARER INFORMATION. The non-critical information includes MBMS ACCESS INFORMATION. The critical information can not be changed during each Modification period while the access information may be changed at any time. The scheduling of MCCH information is shown in FIG. 4.

As can be seen from FIG. 4, the critical information is periodically transferred through the MCCH according to a Repetition period (RP) and a Modification period (MP), and the critical information can not be changed within an MP. The non-critical information, however, is transferred according to an access period, and the access information may be changed in an access period.

Before Step 4 of Session Start in FIG. 3 and possible procedure of counting, in order to save system resources, the UTRAN will request a UE to re-select a preferred frequency layer, and it is likely that the MBMS is transferred only on the frequency layer. Information of the preferred frequency layer is transferred to the user by the network via the MCCH, and the procedure is referred to Frequency Layer Convergence (FLC). By the procedure, the UTRAN can make all UEs within a particular area converge to one frequency layer. Each MBMS has a preferred layer. As the preferred layer is determined by UTRAN, this is an issue of Radio Resource Management (RRM). Therefore, identical services in different areas may have different preferred layers, and different services in the same area may have different preferred layers as well.

At the beginning of Step 4 of Session Start in FIG. 3, before the FLC procedure, the UTRAN may also make a Counting operation to decide which radio bearer mode of air interface is to be used. In an MBMS system, there are two radio bearer modes, the PTP and PTM. Simply speaking, the PTP means that MBMS is transferred to a UE via a dedicated channel in the network, while the PTM means that the MBMS is transferred to a UE via a public channel.

At Step 7 of Session Stop in FIG. 3, as an FLC procedure may have been performed, many users that have received a particular MBMS may have re-selected a particular preferred frequency layer. If so many users conduct a non-MBMS service, a severe congestion in the system will be however caused. That is why another procedure referred to Frequency Layer Dispersion (FLD) is designed in the MBMS system. By this procedure, it is possible for the UTRAN to re-disperse the users to different frequencies so as to reduce the number of users on the original frequency layer and mitigate the congestion in the network. The network will send an instruction on whether there is an FLD operation to users via the MCCH.

In the prior art, the procedure of the FLD operation has only considered the situation that the UE has joined one MBMS and an FLD operation is needed when the session of the MBMS is end. However, no specific procedure has been considered for the situation when there are simultaneously multiple MBMSs.

As no specific procedure of implementing the FLD operation is defined after the FLD is introduced into solutions in the prior art, the user will consider the instruction and carry out responding actions if the network gives the instruction of the FLD operation. In prior art, only the situation that one MBMS has the FLD operation is considered, which however is incomplete in that one UE may join many MBMSs which are providing or will be provided in the network, and are likely to carry on same or different operations which can not be treated as the same, such as the FLC, FLD, counting etc.

If the UE is constrained with the capacity and is impossible to receive so many services, the need for processing based on service priority will arise, i.e. the user has to decide which service is the most desired one and which one is not wanted at present.

Under the circumstances as described above, if the user just follows the instruction of the network in carrying out the FLD operation without considering other services, a severe problem will occur and the user is likely to make selection of frequency layer twice, or can not receive the desired service.

For example, if the UE is in a cell of Frequency 1 and at this time, a Service A and a Service B are provided in the cell (for the UE, the Service A has a higher priority than the Service B). If the Service A is provided in the local cell while the Service B is provided on another frequency layer, the network will instruct the UE to carry out the FLD operation for the Service B; however, the UE will prefer to receive the Service A at this time rather than carry out the FLD operation relevant to the Service B. The solution in the prior art, however, gives no description to the settlement of such a conflict.

The pre-condition for a user carrying out the FLC operation is to completely receive the information of the MBMS provided by the local cell so that the desire of the user could be reflected and relevant operations could be correctly performed. This, however, is not defined in the existing solutions either.

Therefore, there is a major drawback during the flow of prior art, and the user is likely to be unable to get a complete picture of the services provided in the local cell so that the wrong operations may be made, e.g. a user is possible to make such a mistake as first performing the FLD operation and then FLC operation, and waste in power and time is caused by repeated frequency switching.

SUMMARY OF THE INVENTION

In view of the above, embodiments of the present invention provide a method for a UE performing frequency-layer operations in Multimedia Broadcast and Multicast Services (MBMSs) so as to avoid performing wrong frequency-layer operations by the UE under the circumstances that the UE joins multiple MBMSs.

In accordance with the embodiments of the present invention, a method for a User Equipment (UE) performing frequency-layer operations in MBMSs in a communication network, the method includes the steps of:

setting priorities for various frequency-layer operations;
receiving control information of the MBMSs sent from the network; and
performing the frequency-layer operations of the activated MBMSs included in the control information of the MBMSs according to the priorities of frequency-layer operations.

As can be seen from the above technical solution, in accordance with the method provided by the present invention for a UE performing frequency-layer operations in MBMSs, priorities are set in advance for various frequency-layer operations, and the UE, under the circumstance of joining multiple MBMSs, performs frequency-layer operation commands of corresponding MBMSs according to the priorities of the frequency-layer operations after receiving frequency-layer operation commands sent from the network side.

With the technical solution provided by the present invention, when receiving frequency-layer operation commands sent from the network, the UE has a definite procedure to follow, thus avoiding performing wrong frequency-layer operations under the circumstance of joining multiple MBMSs, achieving the highest procedural efficiency with the least consumption, and improving the efficiency of the UE.

EMBODIMENTS OF THE INVENTION

The present invention is hereinafter further described in detail with reference to the accompanying drawings and exemplary embodiments.

The method, in accordance with the present invention, for a UE performing frequency-layer operations in MBMSs is applicable for communication systems providing MBMSs, such as WCDMA, CDMA2000, UTRA TDD and TD-SCDMA. The main idea is to set priorities for various frequency-layer operations in advance; and when receiving frequency-layer operation commands sent from the network side, the UE, under the circumstances of joining multiple MBMSs, performs the frequency-layer operation commands of corresponding MBMS according to the priorities of the frequency-layer operations. Thus, the UE is able to perform frequency-layer operation commands correctly whether the multiple MBMSs are provided on one preferred frequency layer or on different preferred frequency layers.

In accordance with the present invention, priorities of MBMSs may be further set, and frequency-layer operations are performed according to the priorities of the MBMSs and the priorities of the frequency-layer operations.

Two preferred embodiments are hereinafter given to describe the present invention in detail.

The First Preferred Embodiment

Figure 1:
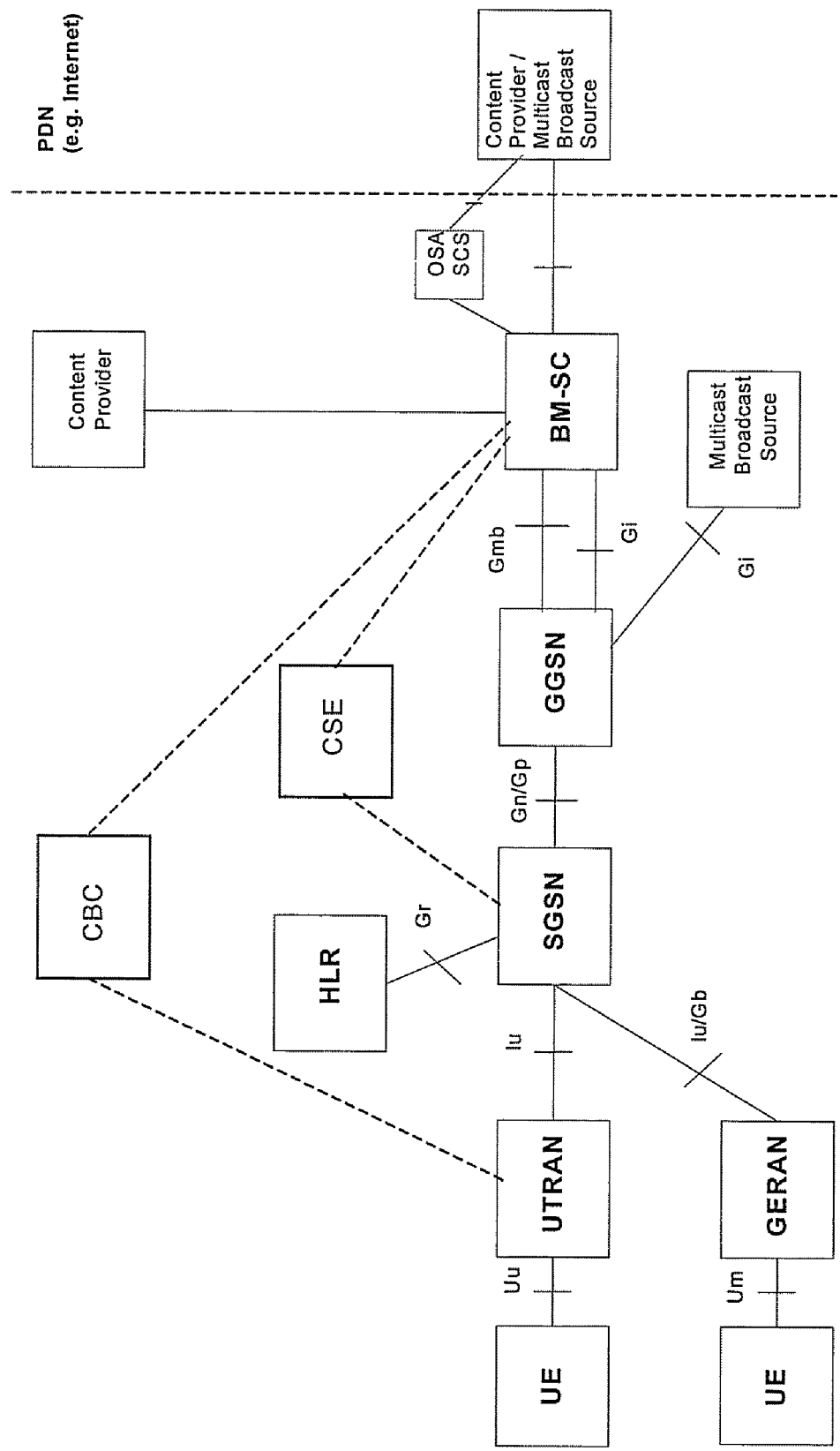
FIG. 1 is a schematic illustrating a reference structure of the MBMS system in accordance with the prior art.
Figure 2:
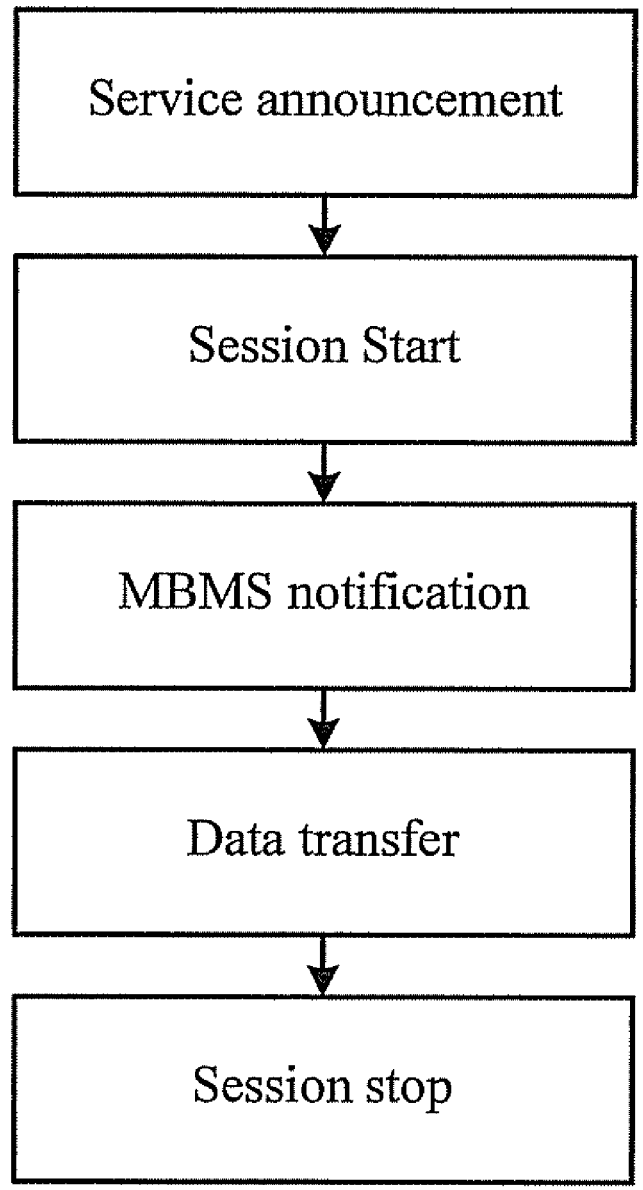
FIG. 2 is a schematic illustrating the flowchart of a UE receiving an MBMS broadcast service in accordance with the prior art.
Figure 3:
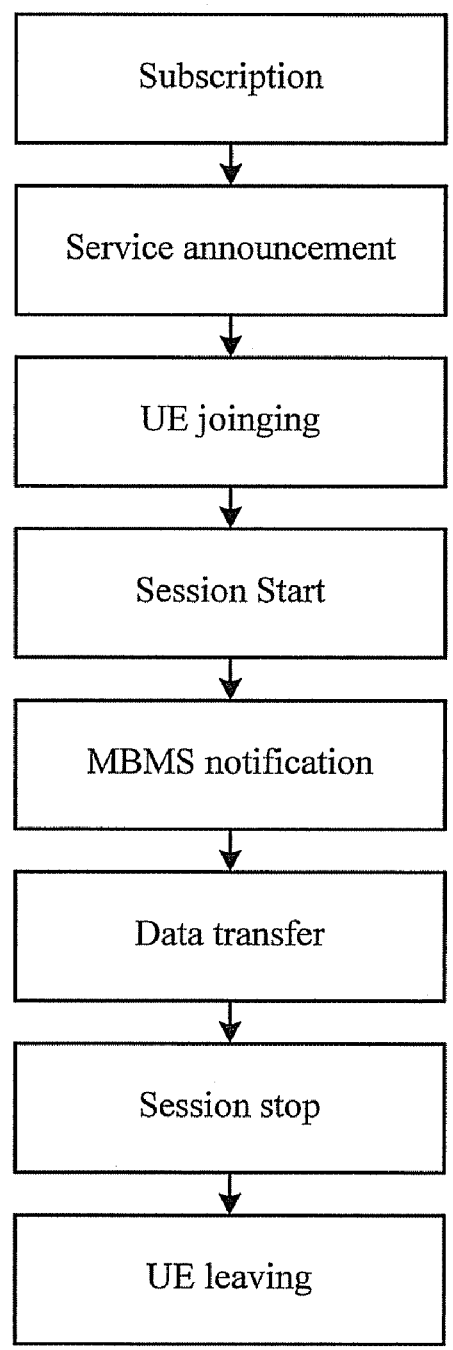
FIG. 3 is a schematic illustrating the flowchart of a UE receiving an MBMS multicast service in accordance with the prior art.
Figure 4:
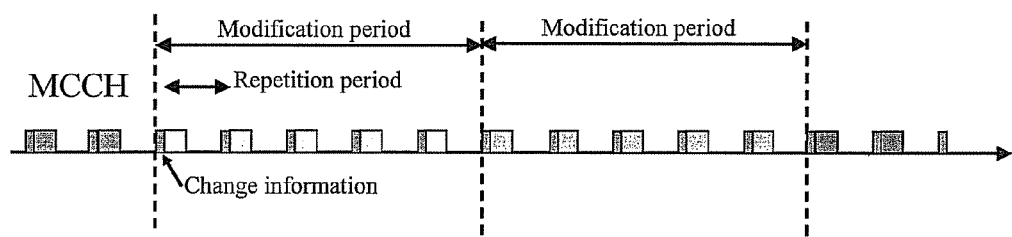
FIG. 4 is a schematic illustrating the MCCH information scheduling in accordance with the prior art.
Figure 5:
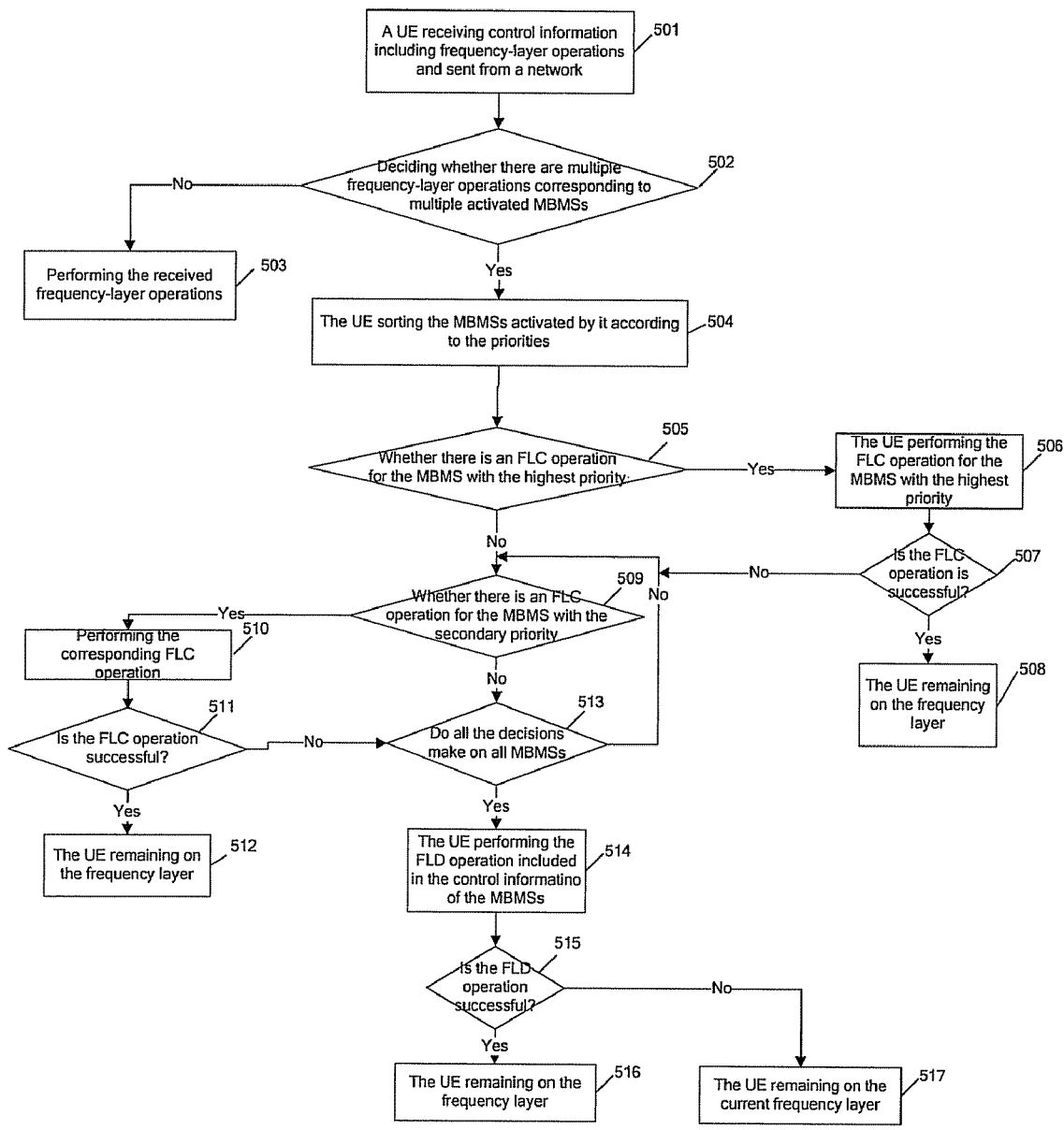
FIG. 5 is a schematic illustrating the flowchart of a First Preferred Embodiment of the method for performing frequency-layer operations in accordance with the present invention.

In the embodiment, an FLC operation and an FLD operation are set priorities in advance, i.e. the FLC operation is set with the highest priority and the FLD operation with the lowest priority. The procedure of a UE performing frequency-layer operations is shown in FIG. 5 which is a flowchart of the method for performing frequency-layer operations in accordance with the First Preferred Embodiment of the present invention, including the steps of:

Step 501: a UE receiving control information of MBMSs which includes frequency-layer operation commands sent from the network.

In one MBMS, a UE may receive from the network a plurality of frequency-layer operation commands related with the MBMS, e.g. FLC commands, FLD commands, or commands for remaining on the current frequency layer (or by means of a default value manner). Such frequency-layer operation commands are sent by the network via the MCCH to users and carried by MSI and USI so that the UE could acquire the relevant control information of all MBMSs in the cell.

The procedure of the network sending frequency-layer operation commands and the UE performing frequency-layer operations can be performed before the UE starts a session, or the UE is in a session, or after the UE finishes a session, i.e. there is no special requirement in this aspect.

Herein, the UE in the step may receive control information of all MBMSs provided in the cell or stop receiving control information of other MBMSs after receiving control information of all or some of the MBMSs joined by it. In other words, the UE may receive the MSI and USI completely and acquire the control information of all MBMSs provided in the cell where the UE is located; or may receive only the MSI and USI of all or some of the MBMSs joined by it and acquire the control information of all or some of the MBMSs joined by it and provided in the cell where it is located.

In the latter case, the UE may stop receiving the control information of other MBMSs after getting a complete collection of the control information of the MBMSs joined by it rather than receiving the control information of all MBMSs. In this way, power consumption of the UE can be reduced.

Step 502: the UE deciding whether there are multiple frequency-layer operation commands corresponding to multiple activated services in the currently received control information of MBMSs; if there are multiple frequency-layer operation commands corresponding to multiple activated services in the currently received control information of MBMSs, proceeding to Step 504; otherwise, proceeding to Step 503.

In the step, the procedure of deciding whether the MBMSs therein are the ones already activated by the user may be performed by some conventional approaches, for example, by comparing the variables MBMS_ACTIVATED_SERVICES in the control information; if there are activated MBMSs, proceed to Step 503 for such MBMSs.

Step 503: if only one MBMS among the MBMSs of which the service information is currently provided by the network, has been activated by the user, performing the operations just according to the instruction corresponding to the MBMS.

Step 504: the UE sorting the MBMSs already activated by the UE according to the priorities.

In the embodiment, the UE first sets priorities for the multiple activated MBMSs after receiving the control information of the MBMSs which includes frequency-layer operations. In practical applications, the UE may set in advance priorities for all the MBMSs to which the user has subscribed.

Alternatively, after receiving the control information of an MBMS which includes a frequency-layer operation, the UE may perform the FLC operation without considering whether there are another FLD operations and the MBMS to which the FLC operation belongs, as long as there is an FLC operation included in the control information of an MBMS, instead of setting priorities for the MBMSs.

In the embodiments, whether or not to sort the MBMSs based on the service priorities may depend on the number of MBMSs in which the UE has joined or different features of the MBMSs. If the MBMSs that have been joined by the UE only include the current MBMS, there is no need for performing the procedure of sorting according to the service priorities, and the MBMS is of course considered as having the highest priority; or if the services have same features, the priorities of these services are possible the same.

When the UE joins multiple activated MBMSs, the order of priorities may depend on the demand of the UE, e.g., the MBMS which is mostly desired by the UE may be set with the highest priority by the user.

Step 505: the UE deciding whether there is an FLC operation for the MBMS with the highest priority among the MBMSs activated and sorted by the UE; if there is the FLC operation for the MBMS with the highest priority among the MBMSs activated and sorted by the UE, proceeding to Step 506; otherwise, proceeding to Step 509.

Step 506: the UE performing the FLC operation according to frequency-layer operation instructions of the MBMS with the highest priority.

Step 507: deciding whether the FLC operation is successful; if the FLC operation is successful, proceeding to Step 508; if the FLC operation is not successful, proceeding to Step 509.

Step 508: the UE remaining on the frequency layer at which the UE is converged under the instruction of the FLC operation.

Step 509: the UE deciding whether there is an FLC operation for the MBMS with the secondary highest priority; if there is the FLC operation for the MBMS with the secondary highest priority, proceeding to Step 510; otherwise, proceeding to Step 513.

Step 510: the UE performing the corresponding FLC operation according to requirements of the FLC operation.

Step 511: deciding whether the FLC operation is successful, if the FLC operation is successful, proceeding to Step 512; if the FLC operation is not successful, proceeding to Step 513.

Step 512: the UE remaining on the frequency layer at which the UE is converged under the instruction of the FLC operation.

Step 513: deciding whether decisions have been made for all MBMSs on whether there is an FLC operation; if decisions have been made for all the MBMSs on whether there is an FLC operation, proceeding to Step 514, otherwise proceeding to the Step 509.

Step 514: the UE performing the FLD operation command included in the control information to disperse the frequency of the UE to a designated frequency layer.

In the step, if the control information includes no FLD operation command, the UE will remain on the current frequency. Obviously, in case that the control information includes the FLD operation command, the UE may remain on the current frequency and perform no FLD operation according to the practical situation or pre-configuration.

Step 515: deciding whether the FLD operation is successful, if the FLD operation is successful, proceeding to Step 516; otherwise, proceeding to Step 517.

Step 516: the UE remaining on the designated frequency layer after the FLD operation is performed.

Step 517: the UE remaining on the current frequency layer.

In the embodiment, when performing FLC operation for the MBMS with the highest priority, the UE may first decide whether the preferred frequency layer of the MBMS with the highest priority is the current frequency where the UE is located; if the preferred frequency layer of the MBMS with the highest priority is the current frequency where the UE is located, the UE will remain on the current frequency; if the preferred frequency layer of the MBMS with the highest priority is not the current frequency where the UE is located, the UE will converge to the preferred frequency of the MBMS with the highest priority.

Specially, if all frequency-layer operations of all MBMSs received by the UE fail, the UE will remain on the current frequency layer.

After the selection of an MBMS with any priority is completed, it is needed to stop the procedure of the corresponding frequency-layer operation. For example, after the FLD operation of an MBMS with higher priority is successful or when the MBMS with higher priority is right on the current frequency layer, it is needed to stop the procedure of frequency-layer operation. When the FLC operation of an MBMS with higher priority is successful, it is also needed to stop the procedures of the frequency-layer operations of other MBMSs on the frequency layer.

The Second Preferred Embodiment

Figure 6:
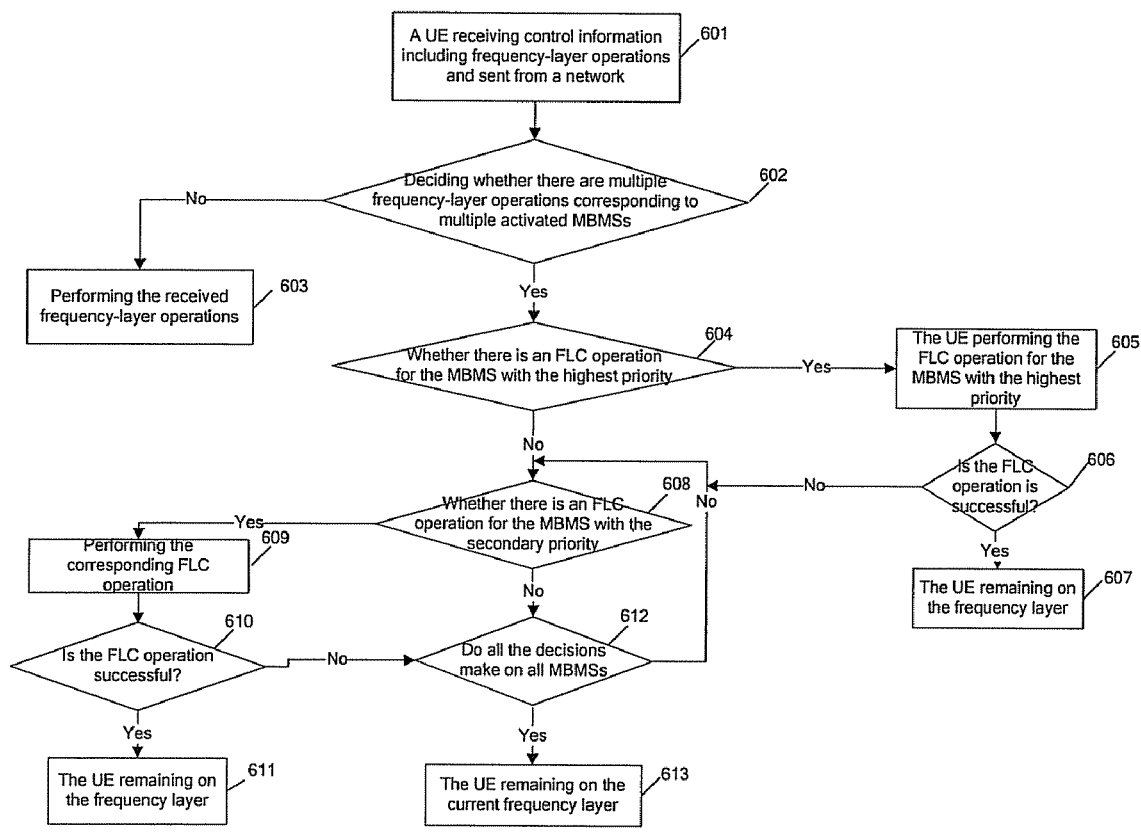
FIG. 6 is a schematic illustrating the flowchart of a Second Preferred Embodiment of the method for performing frequency-layer operations in accordance with the present invention.

In the embodiment, the two types of frequency-layer operations, FLC operation and FLD operation, are likewise set priorities in advance, i.e., the FLC operation is set with the highest priority and the FLD operation with the lowest priority. Meanwhile, in the embodiment, the UE has set in advance priorities for all the subscribed MBMSs. The procedure of the UE performing frequency-layer operations is shown in FIG. 6, which is a flowchart of the method for performing frequency-layer operations in accordance with the Second Preferred Embodiment of the present invention.

Step 601: a UE receiving control information of MBMSs sent from the network and including frequency-layer operation commands.

Step 602: the UE deciding whether there are multiple frequency-layer operation commands corresponding to multiple activated MBMSs in the currently received control information of MBMSs; if there are multiple frequency-layer operation commands corresponding to multiple activated MBMSs in the currently received control information of MBMSs, proceeding to Step 604; otherwise, proceeding to Step 603.

Step 603: if only one MBMS among the MBMSs of which the service information is currently provided by the network, has been activated by the user, performing the operations just according to the instruction corresponding to the MBMS.

The above steps are completely the same as Steps 501 through 503 as shown in FIG. 5, so no further description is repeated here.

Step 604: the UE deciding whether there is an FLC operation for the MBMS with the highest priority among the MBMSs activated by it; if there is an FLC operation for the MBMS with the highest priority among the MBMSs activated by it, proceeding to Step 605; otherwise, proceeding to Step 608.

Step 605: the UE performing the FLC operation according to the instruction of the frequency-layer operation of the MBMS with the highest priority.

Step 606: deciding whether the FLC operation is successful; if the FLC operation is successful, proceeding to Step 607; if the FLC operation is not successful, proceeding to Step 608.

Step 607: the UE remaining on the frequency layer at which the UE is converged under the instruction of the FLC operation.

Step 608: the UE deciding whether there is an FLC operation for the MBMS with the secondary highest priority; if there is an FLC operation for the MBMS with the secondary highest priority, proceeding to Step 609; otherwise, proceeding to Step 611.

Step 609: the UE performing the corresponding FLC operation according to requirements of the FLC operation.

Step 610: deciding whether the FLC operation is successful, if the FLC operation is successful, proceeding to Step 611; if the FLC operation is not successful, proceeding to Step 612.

Step 611: the UE remaining on the frequency layer at which the UE is converged under the instruction of the FLC operation.

Step 612: deciding whether decisions have been made for all MBMSs on whether there is an FLC operation; if decisions have been made for all the MBMSs on whether there is an FLC operation, proceeding to Step 613, otherwise proceeding to the Step 608.

Step 613: the UE remaining on the current frequency layer.

In the step, if the control information includes FLD operation command, the UE may still remain on the current frequency. Alternatively, according to the practical situation or pre-configuration, the UE may also perform the FLD operation command included in the control information to disperse the frequency of the UE to the designated frequency layer.

In the preferred embodiments of the present invention, as there may be various types of frequency-layer operation commands sent from the network, and there may also be various types of frequency-layer operations required by the MBMS activated by the UE, various solutions may be produced in line with the various combinations of the network-sent commands and the MBMS-required operations. This, however, has no impact on the implementation of the technical solution in accordance with the present invention. Numerous variations in line with the principle may be made in applications, which will no longer be described here.

The foregoing is only the preferred embodiments of the present invention and is not for use in limiting the present invention. It is understood to those skilled in the art that the present invention can have all sorts of changes and variations. Any modification, equivalent substitution, and improvement without departing from the spirit and principle of the present invention should be covered by the protection scope of the appended claims of the present invention.

The invention claimed is:

1. A method for a User Equipment (UE) performing frequency-layer operations in a Multimedia Broadcast and Multicast Service (MBMS) in a communication network, the method comprising:

setting priorities for various frequency-layer operations and priorities for MBMS;

receiving control information of the MBMS sent from the network; and performing the frequency-layer operations of the activated MBMS included in the control information of the MBMS according to the priorities of frequency-layer operations;

wherein the process of setting priorities for various frequency-layer operations comprises: setting the highest priority for a Frequency Layer Convergence (FLC) operation, and setting the lowest priority for a Frequency Layer Dispersing (FLD) operation; and the process of performing the frequency-layer operation of the activated MBMS included in the control information of the MBMS according to the priorities of frequency-layer operations comprises:

(B1) the UE acquiring the control information of the MBMS which includes frequency-layer operation and determining whether there is an FLC operation for the MBMS with the highest priority; performing the FLC operation, if it is determined that there is an FLC operation for the MBMS with the highest priority; and proceeding to Step B2, if it is determined that there is no FLC operation for the MBMS with the highest priority;

(B2) determining whether there is the FLC operation for the MBMS with the secondary highest priority; performing the FLC operation, if it is determined that there is the FLC operation for the MBMS with the secondary highest priority; and proceeding to Step B3, if it is determined that there is no FLC operation for the MBMS with the secondary highest priority;

(B3) determining if decisions have been made on whether there are FLC operations for all activated MBMS; if decisions have been made, proceeding to Step B4; if decisions are not made, proceeding to the Step B2; and (B4) the UE remaining on the current frequency layer, or performing the FLD operation included in the control information of the MBMS.

2. The method of claim 1, wherein the process of receiving control information of the MBMS sent from the network comprises: the UE receiving Modified Services Information (MSI) and Unmodified Services Information (USI) completely and acquiring the control information of all the MBMS in a cell where the UE is located.

3. The method of claim 1, wherein the process of receiving control information of the MBMS sent from the network comprises: the UE only receiving the MSI and USI of the whole MBMS or part of the MBMS which the UE joins, and acquiring the control information of the whole MBMS or part of the MBMS which the UE joins in the cell where the UE is located.

4. The method of claim 1, further comprising: if the FLC operation fails in the Step B1, proceeding to the Step B2;

if the FLC operation fails in the Step B2, proceeding to the Step B3; and if the FLD operation fails in the Step B4, the UE remaining on the current frequency layer.

5. The method of claim 1, wherein the process of setting priorities for MBMS comprises: the UE setting in advance priorities for all MBMS to which a user using the UE has subscribed; or in the Step B1, receiving the control information of the MBMS which includes the frequency-layer operations and first setting priorities for the multiple activated MBMS.

6. The method of claim 1, wherein in the Step B1, when determining whether there is the FLC operation for the MBMS with the highest priority, the process of performing the FLC operation comprises:

(B11) the UE determining whether the preferred frequency layer of the MBMS with the highest priority is the current frequency of the UE; the UE remaining on the current frequency layer, if it is determined that the preferred frequency layer of the MBMS with the highest priority is the current frequency of the UE; and proceeding to Step B12, if it is determined that the preferred frequency layer of the MBMS with the highest priority is not the current frequency of the UE; and (B12) the UE converging to the preferred frequency layer of the MBMS with the highest priority.

7. The method of claim 1, wherein the process of performing the frequency-layer operation of the activated MBMS included in the control information of the MBMS according to the priorities of frequency-layer operations comprises the UE comparing MBMS_ACTIVATED_SERVICES in the control information of the MBMS in order to determine whether the MBMS in the control information of the MBMS include the MBMS activated by the UE.

8. A method for a User Equipment (UE) performing frequency-layer operation in Multimedia Broadcast and Multicast Service (MBMS) in a communication network, comprising:

receiving control information of the MBMS which includes frequency-layer operation command sent from a network;

performing the frequency-layer operation of activated MBMS included in the control information of the MBMS according to priorities for the MBMS; and sorting the MBMS already activated by the UE so as to obtain the priorities for the MBMS after receiving the control information of the MBMS which includes the frequency-layer operation command sent from the network.

9. The method of claim 8, wherein the process of receiving the control information of the MBMS which includes frequency-layer operation command sent from a network comprises:

receiving the control information of frequency-layer operation of all MBMS provided in a cell; and wherein each control information of frequency-layer operation includes frequency-layer operation command.

10. The method of claim 8, wherein the process of receiving the control information of the MBMS which includes frequency-layer operation command sent from a network comprises:
receiving the control information of frequency-layer operation of all or some of the MBMS joined by the UE and wherein each control information of frequency-layer operation includes frequency-layer operation command; and
stopping receiving control information of frequency-layer operation of other MBMS.

11. The method of claim 8, wherein the process of performing the frequency-layer operation of activated MBMS included in the control information of the MBMS according to the priorities for the frequency-layer operations and the priorities for the MBMS comprises:
deciding whether there is an FLC operation for the MBMS with the highest priority among the MBMS activated and sorted by the UE; and
performing the FLC operation according to frequency-layer operation instructions of the MBMS with the highest priority if there is the FLC operation for the MBMS with the highest priority among the MBMS activated and sorted by the UE.

12. The method of claim 11, further comprising:
deciding whether there is an FLC operation for the MBMS with the secondary highest priority if there is not the FLC operation for the MBMS with the highest priority among the MBMS activated and sorted by the UE; and
performing the corresponding FLC operation according to requirements of the FLC operation if there is the FLC operation for the MBMS with the secondary highest priority.

13. The method of claim 12, further comprising:
deciding whether decisions have been made for all MBMS on whether there is an FLC operation if there is not the FLC operation for the MBMS with the secondary highest priority;
performing the FLD operation command included in the control information to disperse the frequency of the UE to a designated frequency layer if decisions have been made for all the MBMS on whether there is an FLC operation; and
returning to decide whether there is an FLC operation for the MBMS with the secondary highest priority if decisions have been not made for all the MBMS on whether there is an FLC operation.

14. The method of claim 13, further comprising:
deciding whether the FLD operation is successful;
remaining on the designated frequency layer after the FLD operation is performed if the FLD operation is successful; and
remaining on the current frequency layer if the FLD operation is not successful.

15. The method of claim 8, further comprising:
comparing MBMS_ACTIVATED_SERVICES in the control information of the MBMS in order to determine whether the MBMS in the control information of the MBMS include the MBMS activated by the UE.

16. The method of claim 11, wherein, if deciding there is the FLC operation for the MBMS with the highest priority, the process of performing the FLC operation comprises:
determining whether the preferred frequency layer of the MBMS with the highest priority is the current frequency of the UE;
remaining on the current frequency layer, if it is determined that the preferred frequency layer of the MBMS with the highest priority is the current frequency of the UE;
converging to the preferred frequency layer of the MBMS with the highest priority, if it is determined that the preferred frequency layer of the MBMS with the highest priority is not the current frequency of the UE.

17. The method of claim 8, wherein the performing the frequency-layer operation of activated MBMS included in the control information of the MBMS according to the priorities for the MBMS further comprises:
performing the frequency-layer operation of activated MBMS included in the control information of the MBMS according to priorities for the frequency-layer operations and the priorities for the MBMS.

18. The method of claim 8, further comprising:
setting in advance the priorities for all MBMS to which a user using the UE has subscribed; or
first setting priorities for the multiple activated MBMS.

19. A User Equipment (UE) comprising:
a receiver, configured to receive control information of Multimedia Broadcast and Multicast Service (MBMS) which includes frequency-layer operation command sent from a network; and
a processor, configured to sort the MBMS already activated by the UE so as to obtain the priorities for the MBMS after receiving the control information of the MBMS which includes the frequency-layer operation command sent from the network, and perform the frequency-layer operation of activated MBMS included in the control information of the MBMS according to priorities for the MBMS.

20. The UE of claim 19, wherein
the processor is further configured to decide whether there is an FLC operation for the MBMS with the highest priority among the MBMS activated and sorted by the UE; and
perform the FLC operation according to frequency-layer operation instructions of the MBMS with the highest priority if there is the FLC operation for the MBMS with the highest priority among the MBMS activated and sorted by the UE.

21. The UE of claim 20, wherein
the processor is further configured to decide whether there is an FLC operation for the MBMS with the secondary highest priority if there is not the FLC operation for the MBMS with the highest priority among the MBMS activated and sorted by the UE; and
perform the corresponding FLC operation according to requirements of the FLC operation if there is the FLC operation for the MBMS with the secondary highest priority.

22. The UE of claim 21, wherein
the processor is further configured to decide whether decisions have been made for all MBMS on whether there is an FLC operation if there is not the FLC operation for the MBMS with the secondary highest priority;
perform the FLD operation command included in the control information to disperse the frequency of the UE to a designated frequency layer if decisions have been made for all the MBMS on whether there is an FLC operation; and
return to decide whether there is an FLC operation for the MBMS with the secondary highest priority if decisions have been not made for all the MBMS on whether there is an FLC operation.

23. The UE of claim 22, wherein
the processor is further configured to decide whether the FLD operation is successful;
remain on the designated frequency layer after the FLD operation is performed if the FLD operation is successful; and
remain on the current frequency layer if the FLD operation is not successful.

24. The UE of claim 19, wherein
the processor is further configured to compare MBMS_ACTIVATED_SERVICES in the control information of the MBMS in order to determine whether the MBMS in the control information of the MBMS include the MBMS activated by the UE.

25. The UE of claim 20, wherein, if the processor decides there is the FLC operation for the MBMS with the highest priority, the processor is further configured to
determine whether the preferred frequency layer of the MBMS with the highest priority is the current frequency of the UE;
remain on the current frequency layer, if it is determined that the preferred frequency layer of the MBMS with the highest priority is the current frequency of the UE;
converge to the preferred frequency layer of the MBMS with the highest priority, if it is determined that the preferred frequency layer of the MBMS with the highest priority is not the current frequency of the UE.

26. The UE of claim 19, wherein
the processor is further configured to perform the frequency-layer operation of activated MBMS included in the control information of the MBMS according to priorities for the frequency-layer operations and the priorities for the MBMS.

27. The UE of claim 19, wherein
the processor is further configured to set in advance the priorities for all MBMS to which a user using the UE has subscribed; or
firstly set priorities for the multiple activated MBMS.

* * * * *